(12) United States Patent
Humbeeck et al.

(10) Patent No.: US 8,075,831 B2
(45) Date of Patent: Dec. 13, 2011

(54) OPTIMISATION OF PREFORM PREPARATION IN INJECTION-STRETCH-BLOW-MOULDING

(75) Inventors: Emmanuel Humbeeck, Feluy (BE); Laurent Duranel, Nivelles (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 144 days.

(21) Appl. No.: 12/067,210

(22) PCT Filed: Sep. 15, 2006

(86) PCT No.: PCT/EP2006/066403
§ 371 (c)(1),
(2), (4) Date: Aug. 26, 2008

(87) PCT Pub. No.: WO2007/039429
PCT Pub. Date: Apr. 12, 2007

(65) Prior Publication Data
US 2009/0130359 A1    May 21, 2009

(30) Foreign Application Priority Data
Sep. 22, 2005    (EP) .................................... 05020698

(51) Int. Cl.
*B29C 39/02*    (2006.01)

(52) U.S. Cl. ........................... 264/532; 264/537

(58) Field of Classification Search .................. 264/532, 264/537
See application file for complete search history.

(56) References Cited

U.S. PATENT DOCUMENTS

| | | | |
|---|---|---|---|
| 4,196,731 A | 4/1980 | Laurin et al. | |
| 4,357,288 A | 11/1982 | Oas et al. | |
| 5,849,843 A | 12/1998 | Laurin et al. | |
| 6,599,595 B1* | 7/2003 | Chundury et al. | 428/35.2 |
| 2005/0058741 A1* | 3/2005 | Fujii et al. | 425/529 |
| 2007/0246866 A1* | 10/2007 | Smits | 264/454 |

FOREIGN PATENT DOCUMENTS
EP    1533102 A1 *    5/2005

OTHER PUBLICATIONS

Flick, E.W., "Industrial Synthetic Resins Handbook," Second Edition, William Andrew Publishing/Noyes, 1991, pp. 729-772.

* cited by examiner

*Primary Examiner* — Yogendra N Gupta
*Assistant Examiner* — Jeremiah Smith

(57) ABSTRACT

This invention discloses a method for preparing a preform for two-stage injection-stretch-blow-moulding (ISBM) from polypropylene resin produced with a Ziegler-Natta catalyst system and having a melt flow index MI2 of from 1 to 20 dg/min, wherein polypropylene is injected at a melt temperature of at least 265° C. Also disclosed are the preforms obtainable by the method, the use of the preforms for preparing bottles, and the bottles prepared from the preforms.

7 Claims, No Drawings

OPTIMISATION OF PREFORM PREPARATION IN INJECTION-STRETCH-BLOW-MOULDING

The present invention relates to the preparation of polypropylene preforms for injection-stretch-blow-moulding (ISBM) processes.

EP-A-151741 to Mitsui discloses single-stage manufacturing of articles by ISBM. These articles are prepared from propylene-ethylene random copolymers having a melt flow index of from 4 to 50 dg/min and containing a nucleating agent. The injection moulding temperature is of from 200 to 260° C. and all examples have been carried out with an injection moulding temperature of 220° C.

WO95/11791 to Bekum is directed to a two-stage process for preparing articles by ISBM. The preferred resin is an ethylene-propylene copolymer containing more than 50 wt % of propylene and having a melt index of from 10 to 20 dg/min. The injection cavity fill rate is of from 3 to 5 grams per second and the injection temperature is of about 210° C.

WO05/074428 to Milliken discloses a two-stage process for preparing articles by ISBM. The resin is a polypropylene composition having a melt flow index of from 6 to 50 dg/min, preferably from 13 to 35 dg/min prepared by any method known in the art The mould fill rate is larger than 5 grams per second and the preform articles have sidewalls having a maximum thickness of less than 3.5 mm. The injection temperatures cited in the examples are of 230 and 240° C.

WO99/41293 to BASF discloses the use of metallocene-produced homo- or co-polymers of propylene in ISBM. The range of melt indexes is broadly defined from 0.1 to 1000 dg/min and the injection temperature is of from 200 to 280° C. The polydispersity index of metallocene-prepared polypropylene is very narrow.

None of these resins produce articles having an ideal balance of properties.

It is an aim of the present invention to provide a method using polypropylene for preparing preforms for injection-stretch-blow-moulding in order to prepare articles or hollow containers having excellent optical properties after bi-orientation.

It is also an aim of the present invention to produce injection-stretch-blow-moulded articles having good thickness distribution.

It is another aim of the present invention to produce injection-stretch-blow-moulded articles having good stacking properties.

It is yet another aim of the present invention to produce injection-stretch-blow-moulded articles having excellent drop test, especially at low temperature.

Accordingly, the present invention discloses a method for preparing preforms for two-stage injection-stretch-blow-moulding from polypropylene resin prepared with a Ziegler-Natta (ZN) catalyst system and having a melt flow index MI2 of from 1 to 20 dg/min and wherein polypropylene is injected at a melt temperature of at least 265° C.

The present invention also comprises the preforms obtainable by the method of the invention, the use of said preforms for preparing bottles, and the bottles prepared from said preforms.

The melt flow index MI2 is measured following the method of standard test ISO 1133 under a load of 2.16 kg and at a temperature of 230° C.

The polypropylene resin used in the present invention is prepared with a Ziegler-Natta (ZN) catalyst system. ZN catalyst systems inherently produce polymers having a broad polydispersity index. The polydispersity index is defined as the ratio Mw/Mn of the weight average molecular weight Mw over the number average molecular weight Mn. For sake of clarity, it is repeated that metallocene and single-site catalysts are not ZN catalysts.

It may be a homopolymer or a copolymer of propylene. Preferably it is a random copolymer of propylene. When it is a copolymer of propylene, the preferred comonomer is ethylene and the amount of ethylene present in the resin is of at most 6 wt %, preferably at most 4.5 wt %, more preferably at most 3 wt %, and the preferred minimum is of 2 wt %.

The melt index is of from 1 to 20 dg/min. The preferred minimum MI2 is of 1.5 dg/min; the preferred maximum MI2 is of 15 dg/min.

In another preferred embodiment, the melt index is of from 1 to 4.5 dg/min, preferably from 1.5 to 2.5 dg/min. This embodiment is particularly useful in medical applications, namely the packaging in the medical field, e.g. for packaging parenteral and isotonic liquids.

The resin may additionally contain up to 5000 ppm of a nucleating agent selected for example from sorbitol derivatives, sodium or lithium salts, talc, phosphate derivatives or combinations thereof. Preferably, if present, the nucleating agent is used in an amount of from 200 to 2500 ppm.

Other additives typically employed in the field may be added.

The injection temperature for preparing the preform is of at least 265° C., preferably at least 270° C., more preferably at least 285° C. There is no absolute maximum, provided the additive package is adapted, as is commonly known in the art. Typically however, the maximum will not exceed 350° C., preferably 330° C.

The injection rate $v_{inj}$ is preferably lower than 20 g/s and most preferably of at most 15 g/s. The injection temperature is preferably increased for the lower melt index in order to avoid excessive stress. Increasing the injection temperature allows to increase the injection rate without increasing the stress.

The injection-stretch-blow-moulding can be carried out either in a two-stage process carried out on two separate machines (cold cycle), or in a single-stage process carried out on a single machine (hot cycle). In the present invention, the two-stage process is used and it is typically carried out in two separate locations. It comprises the steps of:
providing a preform by injection moulding on a multi-cavity mould;
cooling the preform to room temperature;
transporting the preform to the stretch-blow moulding machine;
re-heating the preform in the stretch-blow moulding machine in a reflective radiant heat oven following a pre-determined temperature profile for the preform;
optionally passing the heated preform through an equilibrium zone to allow the heat to disperse evenly through the preform wall;
stretching the preform axially by a centre rod and simultaneously orienting the stretched preform radially by high pressure air.

In this process, the stretching step is a critical step and it requires preforms made by an optimised process in order to obtain the best properties of the final article.

The preforms are re-heated in an infrared oven following a heating profile. Typical re-heating temperatures are of from 90 to 140° C.

The stretching is then typically carried out under a blowing pressure of from 5 to 40 bars, preferably of from 8 to 30 bars and most preferably of about 10 bars and with a stretch rod speed of from 1000 to 2000 mm/s, preferably of from 1400 to 1800 mm/s and most preferably of about 1600 mm/s. The stretch rod diameter depends upon the size of the preform. The best results for material distribution in the finished article are obtained when the rod diameter is about ⅔ of that of the preform. For example, for a preform having a diameter of 25 mm, the preferred rod diameter is of about 16 mm.

The final articles prepared with the preforms of the present invention have remarkable optical properties: they have an excellent transparency throughout their whole body or at least throughout most of their body. In addition they have good wall thickness distribution, excellent drop test and very good top load and stacking properties. They also have a number of desirable properties such as for example low water vapour permeability, good squeezability, warm touch, outstanding engraving capability and excellent heat resistance allowing for example hot filling, microwave heating or sterilisation.

These articles are hollow containers and bottles that can be used in various food and non-food applications. The food applications comprise among others the storage of water, juices, oil, flavoured still and carbonated beverages, isotonic drinks, dry products, fresh milk, baby food, sauces and solid food. The non-food applications comprise the storage of home care and personal care products.

The resins having melt flow indexes of less than 4.5 dg/min are particularly preferred in medical applications, namely the packaging in the medical field, e.g. for packaging parenteral and isotonic liquids. These resins are preferably used without nucleating agent.

The properties of the bottles are illustrated by the following examples that are not intended to limit the scope of the invention.

EXAMPLES

Several random copolymers of propylene prepared with a Ziegler-Natta catalyst system have been tested. Their properties are summarised in Table 1.

TABLE 1

|  | Resin | |
| --- | --- | --- |
|  | R1 | R2 |
| C2 (wt %) | 2.8 | 2.8 |
| MI2 (dg/min) | 10 | 1.8 |
| anti-oxidants (ppm) | 740 | 934 |
| nucleating agent (ppm) | 250 | 0 |
| Tm (° C.) | 150.6 | 149 |
| Tc start (° C.) | 132.3 | 109 |
| Tc peak (° C.) | 117.3 | 105 |

The preforms were prepared from these resins on a Arburg 370 machine having a single cavity mould: they had a weight of 16.5 g and they were used to prepare 500 mL bottles having a wall thickness of about 300 μm.

Drop tests allow drop heights of up to 6 m. The bottles are dropped vertically on a metal plate presenting a slope of 15°. For the tests at room temperature and at 5° C., the bottles are filled with water and stored for 48 hours at temperatures of respectively 23 and 5° C. The maximum height without breakage, expressed in m, is given in Table 2. They are compared with the performances of equivalent bottles prepared from PET.

TABLE 2

|  | Resin | | |
| --- | --- | --- | --- |
|  | R1 injected at 240° C. | R1 injected at 270° C. | PET |
| Drop at 23° C. | 4.7 | >6 | >6 |
| Drop at 5° C. | 1.2 | 2.97 | >6 |

The dynamic compression tests were carried out on the same bottles using the method of standard test ASTM D 2659-95. The results are displayed in Table 3.

TABLE 3

|  | Resin | | |
| --- | --- | --- | --- |
|  | R1 injected at 240° C. | R1 injected at 270° C. | PET |
| Empty closed bottles | | | |
| Strength at yield (N) | 119 | 119 | 124 |
| Depth at yield (mm) | 7 | 6.9 | 6.5 |
| Filled closed bottles | | | |
| Strength at yield (N) | 310 | 291 | 212 |
| Depth at yield (mm) | 12.2 | 6.1 | 6 |

The transparency was quantified by the haze measured using the method of standard test ASTM D 1003 for bottles having a wall thickness of about 300 μm. Several types of polypropylene resins were tested and several injection temperatures were used for each resin. The injection speed was of 7 g/s for all tested bottles. The results are displayed in Table 4. In that table, the haze was quantified as follows:
Poor: 20-30%
Fair: 10-20%
Good: 5-10%
Excellent: <5%

TABLE 4

| PP | Nucl. agent (ppm) | Inj. Temp. (° C.) | Haze |
| --- | --- | --- | --- |
| MI2 = 10 dg/min % C2 = 3.4 | 250 | 215 | Poor |
|  |  | 235 | Fair |
|  |  | 260 | Good |
|  |  | 270 | Excellent |
| MI2 = 1.8 dg/min % C2 = 2.8 | 0 | 260 | Fair |
|  |  | 280 | Good |
|  |  | 300 | Excellent |
|  |  | 330 | Excellent |

The wall thickness distribution was improved by decreasing the melt index and thus by consequently increasing the injection temperature. The wall thickness was measured at three different points along the height of the bottle and for each height at four different points along the circumference of the bottle, at 90° from one another. The polypropylene bottles of the prior art all showed an uneven wall thickness distribution. The thickness was rather constant along the circumference of the bottle but varied with height. In the bottles of the present invention, the thickness variation as a function of height is considerably reduced and they have a much better thickness distribution than those of the prior art, thereby making them more resistant to stacking or dynamic compression.

The wall thickness distribution can further be improved by selecting an appropriate rod diameter. For a preform diameter of 25 mm, two rod diameters were tested: 12 and 16 mm respectively. The wall thickness was measured at two heights on 500 mL bottles, at height H1 near the bottom of the bottle and at height H2 at mid-height, and for each height at different points around the bottles' circumference at 90° from one another. The bottles were prepared by ISBM from the same performs with a rod having respectively a diameter of 12 mm and 16 mm. The results for the wall thickness expressed in μm are displayed in Table 5

TABLE 5

| | | Angle (°) | | | |
|---|---|---|---|---|---|
| | | 0 | 90 | 180 | 270 |
| | | 12 mm rod | | | |
| Wall thickness (μm) | Height H1 | 275 | 250 | 475 | 430 |
| | Height H2 | 340 | 320 | 360 | 370 |
| | | 16 mm rod | | | |
| Wall thickness (μm) | Height H1 | 325 | 345 | 350 | 325 |
| | Height H2 | 360 | 370 | 335 | 340 |

The invention claimed is:

1. A method for preparing a bottle by two-stage injection-stretch-blow-moulding (ISBM) that comprises the steps of: a) selecting a polypropylene resin produced with a Ziegler-Natta catalyst system and having a melt flow index MI2 of from 1 to 20 dg/min, wherein the polypropylene resin is a random copolymer of propylene containing at most 6 wt % of ethylene; b) injecting the polypropylene resin of step a) in a mould at a melt temperature of at least 265° C. and at an injection rate of at most 20 g/s to prepare a preform; c) cooling the preform to room temperature; d) transporting the preform to the stretch-blow moulding machine; e) re-heating the preform in the stretch-blow moulding machine in a reflective radiant heat oven following a pre-determined temperature profile for the preform; f) stretching the preform axially by a centre rod and simultaneously orienting the stretched preform radially by high pressure air wherein the rod diameter is selected to be ⅔ of that of the preform.

2. The method of claim 1 further comprising the step, after said re-heating step, of passing the heated preform through an equilibrium zone to allow the heat to disperse evenly through the preform wall.

3. The method of claim 1 wherein the injection temperature is of at least 270° C.

4. The method of claim 3 wherein the injection temperature is of at least 285° C.

5. The method claim 1 wherein the melt flow index MI2 is of from 1.5 to 15 dg/min.

6. The method of claim 1, wherein the melt flow index MI2 is of from 1 to 4.5 dg/min, preferably from 1.5 to 2.5 dg/min.

7. The method of claim 1 wherein the injection rate is of at most 15 g/s.

* * * * *